(12) United States Patent
Attanasio et al.

(10) Patent No.: US 11,586,547 B2
(45) Date of Patent: Feb. 21, 2023

(54) INSTRUCTION CACHING SCHEME FOR MEMORY DEVICES

(71) Applicant: Micron Technology, Inc., Boise, ID (US)

(72) Inventors: Crescenzo Attanasio, Acerra (IT); Massimo Iaculo, San Marco Evangelista (IT); Pasquale Cimmino, Somma Vesuviana (IT); Nicola Cavaliere, Lusciano (IT); Francesco Falanga, Quarto (IT)

(73) Assignee: Micron Technology, Inc., Boise, ID (US)

( * ) Notice: Subject to any disclaimer, the term of this patent is extended or adjusted under 35 U.S.C. 154(b) by 177 days.

(21) Appl. No.: 16/883,769

(22) Filed: May 26, 2020

(65) Prior Publication Data

US 2021/0374061 A1 Dec. 2, 2021

(51) Int. Cl.
G06F 12/00 (2006.01)
G06F 12/0875 (2016.01)
G06F 9/30 (2018.01)

(52) U.S. Cl.
CPC ...... G06F 12/0875 (2013.01); G06F 9/30043 (2013.01); *G06F 2212/452* (2013.01)

(58) Field of Classification Search
CPC .......... G06F 12/0875; G06F 9/30043; G06F 2212/452
See application file for complete search history.

(56) References Cited

U.S. PATENT DOCUMENTS

| | | | | |
|---|---|---|---|---|
| 2006/0020758 | A1* | 1/2006 | Wheeler | G06F 12/0862 711/137 |
| 2015/0378747 | A1* | 12/2015 | Mudusuru | G06F 9/4401 713/2 |
| 2018/0293166 | A1* | 10/2018 | Filippo | G06F 12/0891 |
| 2019/0272122 | A1* | 9/2019 | Xioa | G06F 3/0673 |
| 2020/0174903 | A1* | 6/2020 | Barreh | G06F 11/2736 |

* cited by examiner

*Primary Examiner* — Gurtej Bansal
(74) *Attorney, Agent, or Firm* — Holland & Hart LLP

(57) ABSTRACT

Methods, systems, and devices for an enhanced instruction caching scheme are described. A memory controller may include a first closely-coupled memory component that is associated with storing data and control information and a second closely-coupled memory component that is associated with storing control information. The memory controller may be configured to retrieve data from the first memory closely-coupled component and control information from a second closely-coupled memory component. Control information may be stored in the first closely-coupled memory component, and a memory controller may access the control information stored in the first closely-coupled memory component by transferring, from the first closely-coupled memory component, the control information into the second closely-coupled memory component. After transferring the control information into the second closely-coupled memory component, the memory controller may access the control information from the second closely-coupled memory component.

27 Claims, 6 Drawing Sheets

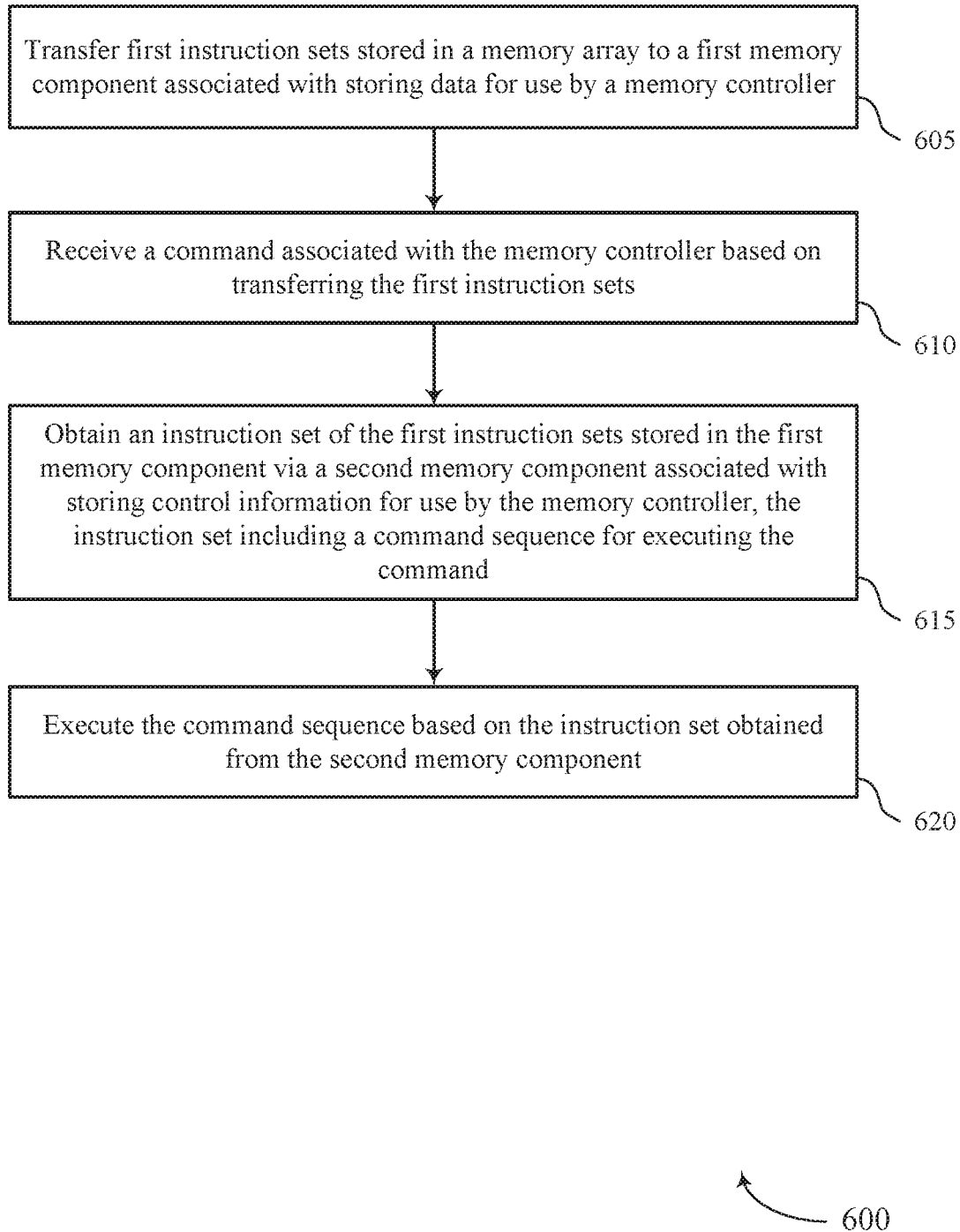

INSTRUCTION CACHING SCHEME FOR MEMORY DEVICES

BACKGROUND

The following relates generally to one or more memory systems and more specifically to an enhanced instruction caching scheme for memory devices.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

BRIEF DESCRIPTION OF THE DRAWINGS

FIGS. 5 and 6 show flowcharts illustrating a method or methods that support an enhanced instruction caching scheme in accordance with examples as disclosed herein.

DETAILED DESCRIPTION

Figure 1:
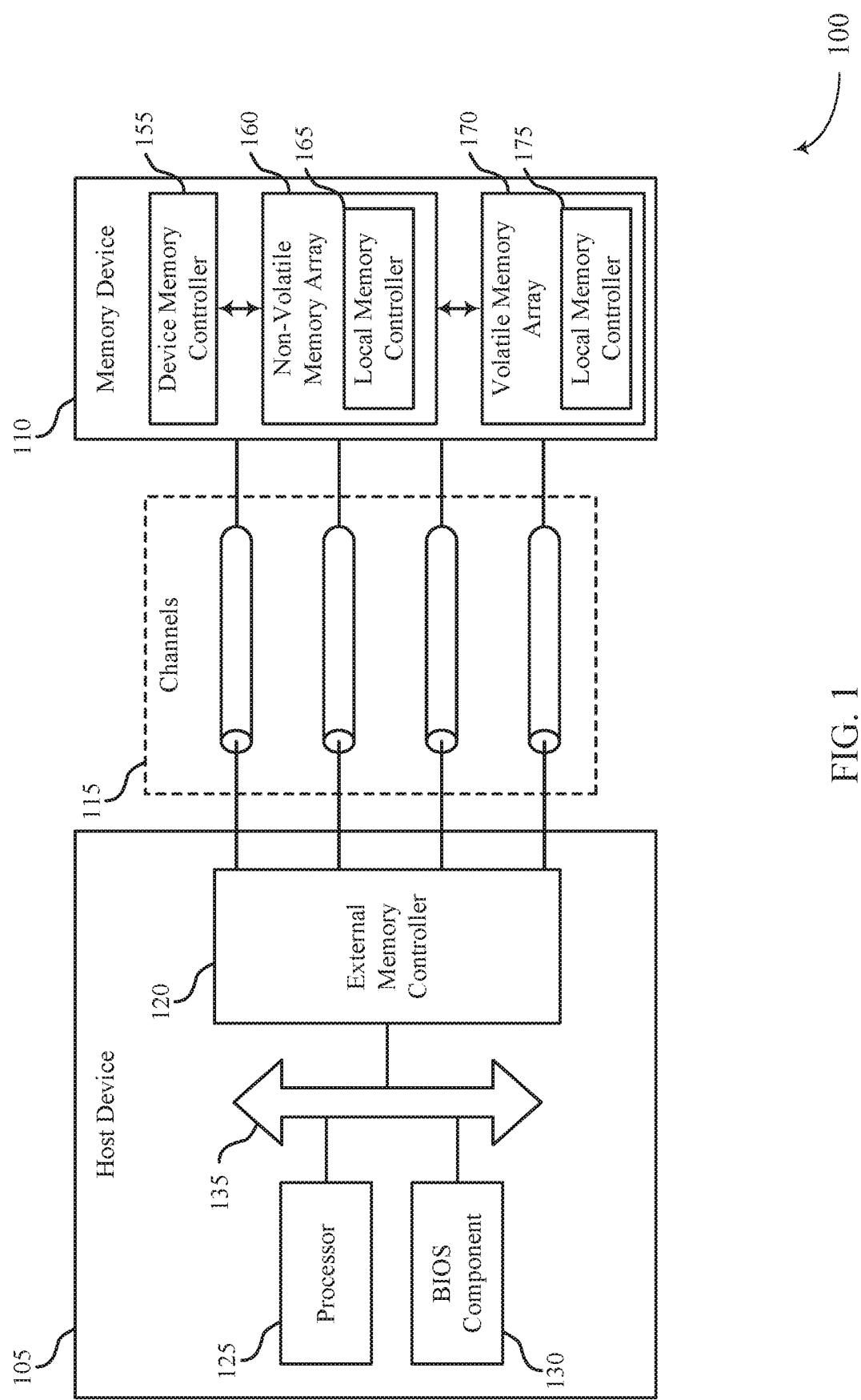
FIGS. 1 and 2 illustrate examples of systems that support an enhanced instruction caching scheme in accordance with examples as disclosed herein.

A memory controller may be configured to access control information (e.g., instructions for executing a memory command) from a first memory component (e.g., from a closely-coupled memory (CCM) for instructions, which may be referred to as an ICCM in some cases) and data from a second memory component (e.g., from a CCM for data, which may be referred to as a DCCM in some cases). Due to a limited capacity of the ICCM, the memory controller may store a portion of available instruction sets in a main memory array that is not closely-coupled with the memory controller. Thus, before executing commands that are associated with instruction sets stored in the main memory array, the memory controller may transfer, from the main memory array, a corresponding instruction set into the ICCM after determining the corresponding instruction set is not stored in the ICCM. But transferring the corresponding instruction set into the ICCM may introduce additional latency into the execution of the corresponding command—e.g., due to the inherent latency of the transfer and/or delays associated with waiting for a prior memory operation to be completed at the main memory array. This additional latency may decrease a data rate of the memory device and/or cause the execution of commands to exceed timing parameters.

Increasing a size of the ICCM may reduce the amount of transfer operations performed by the memory controller—e.g., by increasing a likelihood that a corresponding instruction set is stored at the ICCM. However, increasing a size of the ICCM may increase costs and/or a complexity of a closely-coupled memory system. For example, increasing a size of the ICCM may increase an area used by the ICCM. In some devices (such as mobile computing devices), there may be more stringent space constraints and increasing the area used by the ICCM may not be practical or possible.

To decrease a latency associated with executing commands without increasing a size of the ICCM, a DCCM may be configured to store control information that is accessible by the memory controller through the ICCM. That is, the memory controller may be configured to access instruction sets stored in the DCCM by initiating a transfer, from the DCCM, one or more of the instruction sets into the ICCM and then accessing the one or more instruction sets from the ICCM. Transferring the instruction sets into the ICCM from the DCCM may be performed in less time than transferring the instruction set into the ICCM from the main memory array. Also, transferring, from the DCCM, the instruction sets into the ICCM may be performed while the main memory array is being used to execute a prior memory operation.

Features of the disclosure introduced above are further described below in the context of a system that supports memory operations. Specific examples are then described of a system that supports storing and accessing control information in a DCCM and a process for storing and accessing control information stored in a DCCM. These and other features of the disclosure are further illustrated by and described with reference to apparatus diagrams, system diagrams, and flowcharts that relate to an enhanced instruction caching scheme.

FIG. 1 illustrates an example of a system 100 that supports an enhanced instruction caching scheme in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100. System 100 may include non-transitory CRM (e.g., external memory controller 120 or device memory controller 155) storing instructions (e.g., firmware) for performing methods for performing an enhanced instruction caching scheme (e.g., methods 500 and 600), described herein. For example, the instructions, when executed by external memory controller 120 (or more specifically processor 125), may cause the external memory controller 120 to perform the methods for performing an enhanced instruction caching scheme as described herein.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory arrays to support a desired capacity or a specified capacity for data storage. In some cases, memory device 110 may include a non-volatile memory array 160 and a volatile memory array 170. Each memory array may include a local memory controller (e.g., first local memory controller 165 and second local memory controller 175). A memory array may be a collection (e.g., one or more grids, one or more banks, one or more tiles, one or more sections) of memory cells, with each memory cell being operable to store at least one bit of data. In some cases, non-volatile memory array 160 may include not-AND (NAND) memory cells that are implemented using sets of transistors that are arranged to form NAND circuitry. In some cases, volatile memory array 170 may include DRAM cells or another memory technology.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the non-volatile memory array 160, the volatile memory array 170, or the processor 125, or any combination thereof. In some examples, the device memory controller 155 may control operation of the memory device 110 described herein in conjunction with the first local memory controller 165 of the non-volatile memory array 160 and/or the second local memory controller 175 of volatile memory array 170.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory array to the host device 105.

A local memory controller, such as first local memory controller 165 or second local memory controller 175, may be operable to control operation of a corresponding memory array. In some examples, first local memory controller 165 and/or second local memory controller 175 may be operable to communicate (e.g., receive or transmit data or commands or both) with the device memory controller 155. In some examples, a memory device 110 may not include a device memory controller 155, and one or both of first local memory controller 165 and second local memory controller 175, or the external memory controller 120, may perform various functions described herein. As such, a local memory controller may be operable to communicate with the device memory controller 155, with other local memory controllers, or directly with the external memory controller 120, or the processor 125, or any combination thereof. Examples of components that may be included in the device memory controller 155 or the local memory controllers, or both, may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller, or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, first local memory controller 165, second local memory controller 175, or any combination thereof) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels, one or more clock signal (CK) channels, one or more data (DQ) channels, one or more other channels, or any combination thereof. In some examples, signaling may be communicated over the channels 115 using single data rate (SDR) signaling or double data rate (DDR) signaling.

A memory controller, such as external memory controller 120, device memory controller 155, first local memory controller 165, and/or second local memory controller 175, may be configured to access control information from an ICCM and data from a DCCM. The control information (e.g., instructions, command sequences, etc.) may be used by the memory controller to execute received memory commands. Due to limited space in the ICCM, the memory controller may store a portion of available instruction sets in another memory array, such as non-volatile memory array 160 or volatile memory array 170, that is not closely-coupled with the memory controller. Thus, before executing certain commands (e.g., commands received from host device 105), the memory controller may transfer a corresponding instruction set into the ICCM from the other memory array after determining the corresponding instruction set is not stored in the ICCM. But transferring the corresponding instruction set into the ICCM may introduce additional latency into the execution of the corresponding command—e.g., due to the inherent latency of the transfer and/or delays associated with waiting for a prior, ongoing memory operation to be completed at the other memory array. This additional latency may decrease a data rate of the memory device and/or cause the execution of commands to exceed timing parameters.

Increasing a size of the ICCM may reduce the amount of transfer operations performed by the memory controller—e.g., by increasing a likelihood that a corresponding instruction set is stored at the ICCM. However, increasing a size of the ICCM may increase costs and/or a complexity of a closely-coupled memory system.

To decrease a latency associated with executing commands while minimizing a size of the ICCM, a DCCM may be configured to store control information that is accessible by the memory controller through the ICCM. That is, the memory controller may be configured to access instruction sets stored in the DCCM by initiating a transfer of one or more of the instruction sets into the ICCM from the DCCM and then accessing the one or more instruction sets from the ICCM. Transferring the instruction sets into the ICCM from the DCCM may be performed in less time than transferring the instruction set into the ICCM from the memory array. Also, transferring the instruction set into the ICCM from the DCCM may be performed while the other memory array is being used to execute a prior memory operation.

Figure 2:
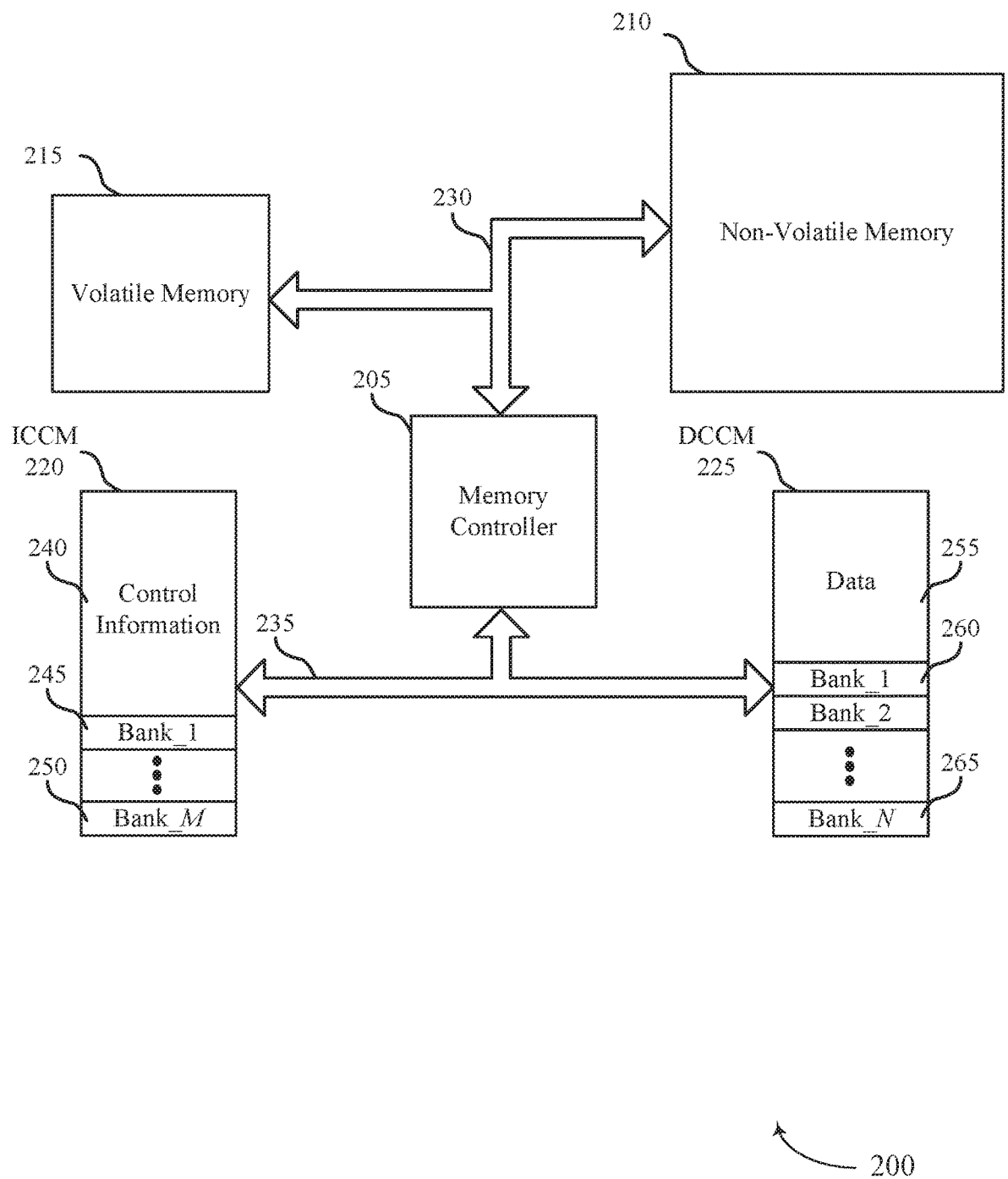

FIG. 2 illustrates an example of a system that supports an instruction caching scheme in accordance with examples as disclosed herein. System 200 may be configured to support the transfer of instructions between closely-coupled memory (CCM) components (e.g., an ICCM and a DCCM) and may be an example of system 100 of FIG. 1. System 200 may include memory controller 205, non-volatile memory 210, volatile memory 215, ICCM 220, DCCM 225, first bus 230, and second bus 235.

Memory controller 205 may be configured to store, arrange, and access information (e.g., control information or data) located in memory devices, such as non-volatile memory 210, volatile memory 215, ICCM 220, and DCCM 225. In some cases, memory controller 205 may be closely-coupled with ICCM 220 and DCCM 225. In other words, memory controller 205 may be have a direct connection to the control information stored in ICCM 220 and the data stored in DCCM 225. Thus, memory controller 205 may be capable of accessing the information stored in ICCM 220 and DCCM 225 without interfacing with additional logic or memory controllers. Thus, ICCM 220 and DCCM 225 may be accessed by memory controller 205 in a shorter amount of time (i.e., with lower latency) than non-volatile memory 210 and/or volatile memory 215.

Memory controller 205 may be further configured to access control information (e.g., instructions) solely from ICCM 220 and solely data from DCCM 225. That is, memory controller 205 may include first circuitry (e.g., buses, processing units, etc.) that is dedicated to accessing and processing information stored in ICCM 220 and second circuitry that is dedicated to accessing and processing information stored in DCCM 225. A configuration that causes memory controller 205 to access control information solely from ICCM 220 and data solely from DCCM 225 may reduce a complexity of a memory system—such a configuration may be referred to as a "Harvard architecture". For example, dedicated buses may be established between memory controller 205, ICCM 220, and DCCM 225. Thus, techniques for multiplexing control information and data may be avoided and overhead dedicated to differentiating control information and data may be eliminated.

In some cases, memory controller 205 may be located within a host device and may be an example of external memory controller 120 described with reference to FIG. 1. In some cases, memory controller 205 may be implemented by hardware (e.g., processor 125), firmware, software, or any combination thereof. In other cases, memory controller 205 may be located within a memory device and may be an example of device memory controller 155, first local memory controller 165, or second local memory controller 175 described with reference to FIG. 1. In some examples, memory controller 205 may be configured to issue commands for operating a memory device—e.g., based on receiving a request from a host device (or an application running on a host device) to read or write information to memory. In some examples, before issuing a command, memory controller 205 may be configured to retrieve, from ICCM 220, instructions for executing the command (which may include or be a command sequence). Memory controller 205 may then transmit the command sequence to a memory device—e.g., to a different memory controller located at a memory device. In some examples, memory controller 205 issues different command sequences for a same command based on whether non-volatile memory 210 or volatile memory 215 is being accessed by memory controller 205.

Non-volatile memory 210 may be configured to store information regardless of whether a memory device is powered on. Non-volatile memory 210 may be configured to store data and/or control information (e.g., command sequences). Non-volatile memory 210 may be include non-volatile memory array 160 and/or first local memory controller 165 of FIG. 1. Non-volatile memory 210 may be accessed as described with reference to FIG. 1.

Volatile memory 215 may be configured to store information while a memory device is powered on. Volatile memory 215 may be configured to store data and/or control information. Volatile memory 215 may include volatile memory array 170 and/or second local memory controller 175 of FIG. 1. Volatile memory 215 may be accessed as described with reference to FIG. 1.

ICCM 220 may be configured to store control information for use by memory controller 205. In some examples, ICCM 220 may include non-volatile and/or volatile storage components. ICCM 220 may include unbanked control memory 240 and banked control memory, which may include M control memory banks: first control memory bank 245 to Mth control memory bank 250. In some examples, unbanked control memory 240 may include memory locations that are directly accessible by memory controller 205—that is, a command that includes an address of a location of unbanked control memory 240 may be used to directly access information stored at the physical location of unbanked control memory 240. By contrast, banked control memory may include control memory locations that are indirectly accessible by memory controller 205—that is, a command that includes an address of a location of unbanked control memory 240 (e.g., a page register) may be used to indirectly access information stored at a location in the banked control memory of ICCM 220 that has a different physical address than the address included in the command.

Unbanked control memory 240 may be accessed with lower latency than banked control memory—notably, banked control memory in ICCM 220 may be accessed with lower latency then non-volatile memory 210 or volatile memory 215. However, a quantity of locations in unbanked control memory 240 may be limited based on a quantity of bits designated for addressing different control memory locations. Thus, ICCM 220 may store control information that is commonly used (e.g., read, write, encoding, and decoding command sequences) or operation-critical in unbanked control memory 240. ICCM 220 may store control information that is less commonly used (e.g., cmd6 or cmd8 command sequences) in banked control memory. In some cases, memory controller 205 may update the control information stored in a banked control memory location—e.g., based on determining that a command sequence for executing a received command is not stored in (or is absent from) ICCM 220. To update the control information stored in the banked control memory location, memory controller 205 may transfer the command sequence from non-volatile memory 210 or volatile memory 215.

DCCM 225 may be configured to store data for use by memory controller 205. In some examples, DCCM 225 may include non-volatile and/or volatile storage components. DCCM 225 may include unbanked data memory 255 and banked data memory, which may include N memory banks: first data memory bank 260 to Nth data memory bank 265. In some cases, a value of N may be greater than a value of M. Unbanked data memory 255 and the banked data memory included in DCCM 225 may be similarly configured as unbanked control memory 240 and banked control memory included in ICCM 220. DCCM 225 may store intermediary data in unbanked data memory 255. Intermediary data may include data that is in the process of being changed (which may also be referred to as transient data) and may be different than the data that is actually written to or read from memory. Changing data may include the inversion of all or a portion of received bits before the data is stored or outputted. Intermediary data may also include data that is used to support the execution of a memory operation—e.g., in cases when the memory controller 205 determines information about data before storing or outputting the data. In some examples, unbanked data memory 255 may be used to implement a memory stack.

First bus 230 may be configured to route information between memory controller 205, non-volatile memory 210, and/or volatile memory 215. In some cases, first bus 230 may include a first set of conductors that connects memory controller 205 with non-volatile memory 210 and a second set of conductors that connects memory controller 205 with volatile memory 215. In such cases, memory controller 205 may be capable of accessing information stored in non-volatile memory 210 concurrently with accessing information stored in volatile memory 215. In some cases, the first set of conductors may be referred to as a different bus than the second set of conductors. In some cases, first bus 230 may include a single set of conductors that connects memory controller 205 with non-volatile memory 210 and volatile memory 215. In such cases, memory controller 205 may be limited to accessing information stored in one of non-volatile memory 210 or volatile memory 215 during a same period. In some examples, memory controller 205 may output information retrieved from non-volatile memory 210 and volatile memory 215 to a host device—e.g., when memory controller 205 is located at the host device. In other examples, the first and/or second conductors in first bus 230 may also be connected with a host device and may be used to output information directly to the host device—e.g., when memory controller 205 is located at a memory device.

Second bus 235 may be configured to route information between memory controller 205, ICCM 220, and/or DCCM 225. In some cases, second bus 235 may include a first set of conductors that connects memory controller 205 to ICCM 220, where control information may be transmitted over the first set of conductors. Memory controller 205 may use the first set of conductors to transmit commands to ICCM 220—e.g., to read information from ICCM 220. Second bus 235 may also include a second set of conductors that connects memory controller 205 to DCCM 225, where data may be transmitted over the second set of conductors. Memory controller 205 may use the second set of conductors to transmit commands to DCCM 225—e.g., to read information to or write information from DCCM 225.

A memory controller 205 may be configured to access control information solely from ICCM 220. In some cases, control information requested from ICCM 220 by memory controller 205 may not be stored in ICCM 220. However, the requested control information may be stored in at least one of non-volatile memory 210 or volatile memory 215. In some cases, to retrieve the control information, memory controller 205 may transfer the control information from non-volatile memory 210 or volatile memory 215 to ICCM 220. After transferring the control information, memory controller 205 may access the control information from ICCM 220.

In some cases, the latency associated with transferring control information to ICCM 220 from non-volatile memory 210 or volatile memory 215 may decrease a performance of memory controller 205—e.g., by increasing a duration between when a command is received and when the command is executed. In some cases, the increase in latency may be exacerbated if the command is received while a memory operation (e.g., a read operation, write operation, etc.) is being performed at non-volatile memory 210 or volatile memory 215, whichever stores the requested control information. Similarly, the increase in latency may be greater if the command is received while first bus 230 is occupied for a memory operation being performed at either non-volatile memory 210 or volatile memory 215, regardless of where the requested control information is stored—e.g., when first bus 230 includes a single set of conductors. Increasing a size of ICCM 220 may reduce the amount of transfer operations performed by memory controller 205—e.g., by increasing a likelihood that the requested control information is stored at ICCM 220. However, increasing a size of ICCM 220 may increase costs and/or a complexity of a closely-coupled memory system.

In other cases, the latency associated with transferring control information to control information to ICCM 220 from non-volatile memory 210 or volatile memory 215 may use certain control information to be stored in ICCM 220 (e.g., in unbanked control memory 240). That is, certain commands may have a certain duration to be executed, and thus, may be permanently stored in ICCM 220 to ensure that memory controller 205 will be able to execute the commands in the duration. In some examples, a cmd8 command is stored in ICCM 220 to ensure its timely execution because overhead for loading a location of the banked memory in ICCM 220 may be unsustainable. A cmd8 command may be used to cause a memory device to output a content of a register that stores device-specific information for the memory device (which may be referred to as an "extended card-specific data (EXT_CSD) register"). In some examples, the register is stored in volatile memory 215. In some examples, a cmd6 command is stored in ICCM 220 to ensure its timely execution because of strict latency parameters for its execution. A cmd6 command may be used to switch a mode of operation of a memory device or to modify the contents of the register that stores device-specific information for the memory device.

To decrease latency associated with memory controller 205 executing commands without increasing (or while minimizing) a size of ICCM 220, DCCM 225 may be configured to store control information that is accessible by memory controller 205 via ICCM 220. That is, when memory controller 205 determines that control information is not stored in ICCM 220, memory controller 205 may transfer, from DCCM 225, the control information into ICCM 220 rather than transferring the control information from non-volatile memory 210 and/or volatile memory 215. Transferring control information into ICCM 220 from DCCM 225 may take less time than transferring control information from non-volatile memory 210 and/or volatile memory 215. Also, control information may be transferred into ICCM 220 from DCCM 225 while non-volatile memory 210 and/or volatile memory 215 are engaged in operations for a prior command. In cases where the DCCM 225 does not store the requested control information, the memory controller 205 may transfer, from a non-volatile memory 210 or a volatile memory 215, the control information into the ICCM 220.

To support the transfer of control information into ICCM 220 from DCCM 225, DCCM 225 may be configured to store control information in N banked memory locations including first data memory bank 260 to Nth data memory bank 265. In some cases, a quantity of memory banks included in DCCM 225 may be based on an expected operation for memory controller 205 after deployment into the field—e.g., DCCM 225 may be configured with an additional quantity of data memory banks if memory controller 205 is likely to regularly use a wide variety of commands during operation. In some cases, the quantity of memory banks included in DCCM 225 may be configured during operation—e.g., DCCM 225 may be configured by memory controller 205 to have more or fewer data memory banks based on a mode of operation configured for memory controller 205.

To further support the transfer of control information into ICCM 220 from DCCM 225, second bus 235 may include a third set of conductors that connects ICCM 220 to DCCM 225, where control information may be transmitted over the third set of conductors. Memory controller 205 may use the first set of conductors and the second set of conductors to transmit control signaling to ICCM 220 and DCCM 225 that initiates the transfer of control information from DCCM 225 to ICCM 220. Alternatively, memory controller 205 may use the third set of conductors to transmit control signaling to ICCM 220 and DCCM 225 that initiates the transfer of control information from DCCM 225 to ICCM 220. Operations associated with transferring control information into ICCM 220 from DCCM 225 are discussed in more detail herein and with reference to FIG. 3.

Figure 3:
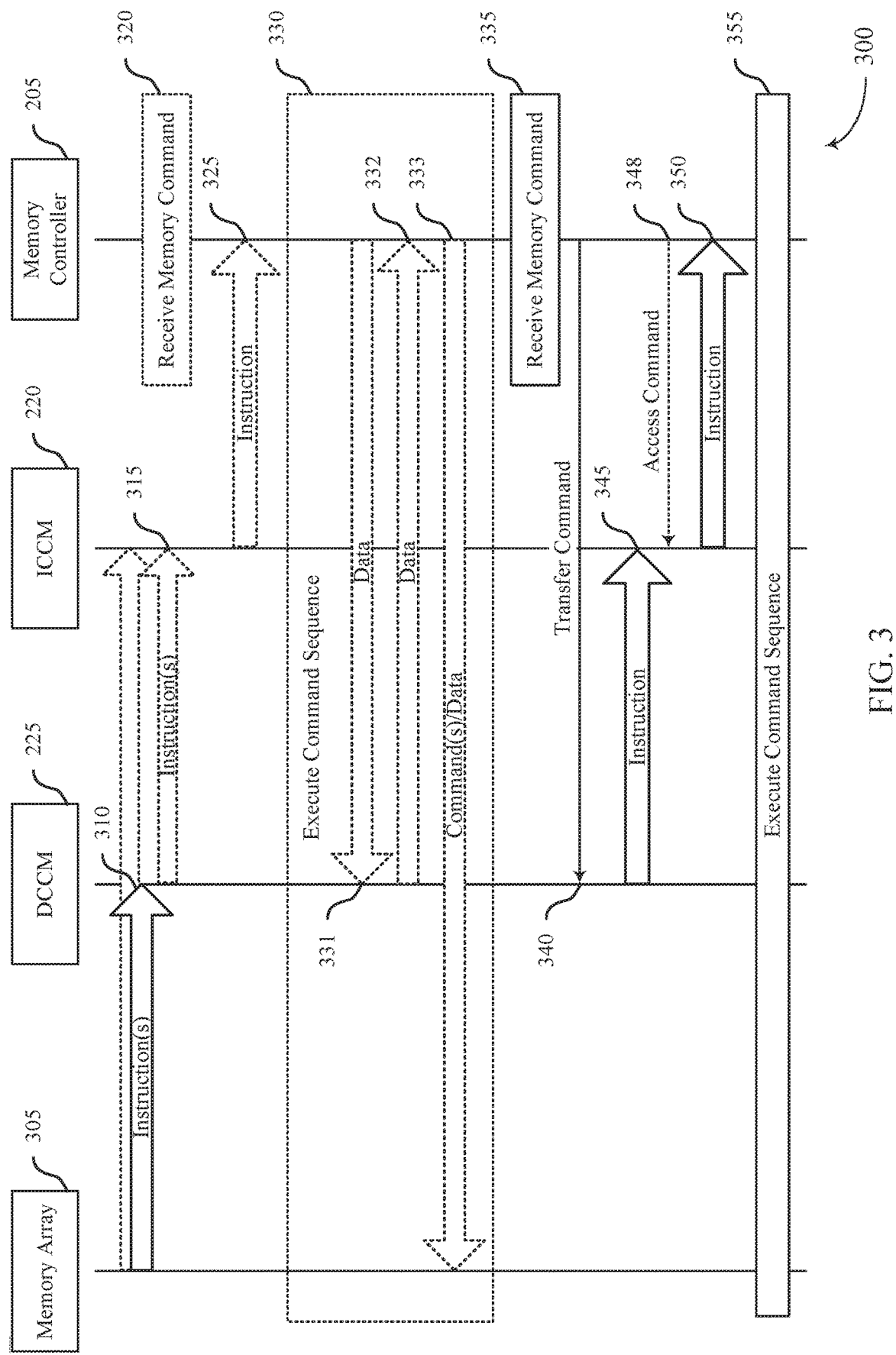
FIG. 3 illustrates an example of a process for an enhanced instruction caching scheme in accordance with examples as disclosed herein.

FIG. 3 illustrates an example of a process for an enhanced instruction caching scheme in accordance with examples as disclosed herein. Process flow 300 may be performed by memory controller 205, ICCM 220, and DCCM 225 of FIG. 2 as well as memory array 305. Memory array 305 may be an example of non-volatile memory 210 and/or volatile memory 215 described with reference to FIG. 2.

Process flow 300 may depict signaling exchanged and processing performed to support an enhanced instruction caching scheme. Process flow 300 may illustrate an example where memory controller 205 accesses control information (e.g., a set of instructions or command sequences) stored in ICCM 220 by transferring, from DCCM 225, control information into ICCM 220. One skilled in the art would understand that one or more of the operations described in process flow 300 may be performed earlier or later in the process, omitted, replaced, supplemented, or any combination thereof. Also, additional operations described herein that are not explicitly included in process flow 300 may be included.

Prior to arrow 310, memory controller 205, ICCM 220, DCCM 225, and memory array 305 may be powered on.

At arrow 310 and during a startup procedure, first instruction sets (e.g., command sequences) for use by memory controller 205 may be transferred from memory array 305 to DCCM 225. In some cases, memory controller 205 sends a command to memory array 305 which initiates the transfer of the first instruction sets into DCCM 225. In other cases, memory array 305 automatically transfers the first instruction sets into DCCM 225 as a part of the startup procedure. The first instruction sets may be selected based on a prior determination that a likelihood of each of the first instruction sets to be requested by memory controller 205 is above a first threshold. Additionally, or alternatively, the first instruction sets may be selected based on latency characteristics of the first instruction sets being below a threshold. Additionally, or alternatively, the first instruction sets may be selected based on a size of the first instruction sets being above a threshold. The first instruction sets may be stored in banked memory at DCCM 225. In some examples, the first instruction sets include an instruction set for performing a cmd6 command—e.g., based on a latency characteristic of the instruction being below a threshold. In some examples, the first instruction sets include an instruction set for performing a cmd8 command—e.g., based on a size of the instruction set exceeding a threshold.

In some cases, as part of the startup procedure, second instruction sets for use by memory controller 205 may also be transferred from memory array 305 to ICCM 220—e.g., based on receiving a command from memory controller 205 or automatically. The second instruction sets may be selected based on a prior determination that a likelihood of each of the second instruction sets to be requested by memory controller 205 is above a second threshold that is greater than the first threshold. The stored instruction sets may be stored in banked memory at ICCM 220. In some examples, a quantity of the first instruction sets is greater than a quantity of the second instruction sets. In some examples, after transferring the first and/or second instruction sets, the memory array 305 may store additional instructions sets. A likelihood of each of the additional instruction sets to be requested by memory controller 205 may be below the first threshold.

At arrow 315, as part of the startup procedure, a subset of the first instruction sets may be transferred from DCCM 225 to ICCM 220—e.g., based on receiving a command from memory controller 205 or automatically. The subset of the first instruction sets may be selected based on a prior determination that a likelihood of each of the subset of the first instruction sets to be requested by memory controller 205 is above a second threshold that is greater than the first threshold. The subset of the first instruction sets may be stored in banked memory at ICCM 220.

At block 320, a memory command may be received. For example, memory controller 205 may receive a memory command. In some cases, memory controller 205 may receive the memory command from a host device—e.g., when memory controller 205 is located within a memory device. In some cases, memory controller 205 may receive the memory command from an application running on a host device—e.g., when memory controller 205 is located within a host device. In addition to receiving the memory command, memory controller 205 may also receive data—e.g., if the command is a write command. In some examples, memory controller 205 may determine that an instruction set for executing the obtained command (e.g., a command sequence) is stored in ICCM 220.

At arrow 325, an instruction set for executing the obtained command may be retrieved. For example, memory controller 205 may retrieve the instruction set for executing the obtained command from ICCM 220 based on determining that the instruction set is located in ICCM 220. In some examples, memory controller 205 may retrieve the instruction set by accessing control information stored at one or more banked memory locations of ICCM 220. The instruction set for executing the obtained command may include a command sequence associated with the obtained command.

At block 330, the obtained command may be executed. For example, memory controller 205, DCCM 225, and/or memory array 305 may be used to execute the obtained command in accordance with the retrieved instruction set. To execute the obtained command, the memory controller 205, DCCM 225, and/or memory array 305 may execute a command sequence for the command. In some examples, the command sequence may be associated with writing data to memory array 305. Before writing the data to the memory array 305, memory controller 205 may modify the data (e.g., encode the data). In some cases, modifying the data may involve applying an exclusive OR operation to a portion of the bits included in the data for one or more iterations—e.g., until the data meets a threshold. In other cases, memory controller 205 may buffer data received in a command in DCCM 225 until a previous command for reading or writing to memory array 305 is completed.

At arrow 331, data or a modified data version of the data may be sent. For example, memory controller 205 may send the data or a modified version of the data to DCCM 225. In some cases, additional processing is performed on the data before the completed data is sent back to memory controller 205 at arrow 332. At arrow 333, after processing the data and/or completing previous memory operations, memory controller 205 may issue one or more commands (e.g., activate (ACT), read (RD), write (WR), and precharge (PRE) commands) to memory array 305 as well as the completed data.

At block 335, an additional memory command may be received. For example, memory controller 205 may receive an additional memory command. In some examples, the memory command is a cmd6 command or a cmd8 command. In some examples, memory controller 205 may determine that an instruction set for executing the obtained additional command (e.g., an additional command sequence) is not stored in ICCM 220.

At arrow 340, a transfer command may be transmitted. For example, memory controller 205 may transmit a transfer command that initiates a transfer of the instruction set for executing the additional command into ICCM 220 from DCCM 225. In some examples, memory controller 205 may transmit a same control signal to ICCM 220 and DCCM 225 that causes DCCM 225 to release the instruction set onto a shared bus and ICCM 220 to load the contents of the shared bus into a banked control memory location. In other examples, memory controller 205 concurrently or sequentially transmits different control signals to cause DCCM 225 to release the instruction set onto a bus shared with the ICCM 220 and causes ICCM 220 to load the contents of the bus into a banked control memory location.

At arrow 345, an instruction set may be released onto a bus based on the control signaling. For example, DCCM 225 may release the instruction set onto a bus from a banked data memory location based on receiving the control signaling from memory controller 205. Concurrently, ICCM 220 may load the contents of the bus into a banked control memory location based on receiving the control signaling from memory controller 205. In some examples, the execution of the command sequence described at block 330 may be ongoing when the additional memory command is received. In such cases, by storing the first instructions in DCCM 225, the memory controller 205 may transmit the control signaling and the instruction set may be transferred into ICCM 220 from DCCM 225 concurrently with the execution of the command sequence described at block 330—e.g., instead of waiting for the command sequence to be completed at memory array 305 before transferring the instruction set.

At arrow 348, an access command may be transmitted. For example, memory controller 205 may transmit an access command that gives memory controller 205 access to the location of the banked memory location in ICCM 220 that stores the transferred instruction set.

At arrow 350, an instruction set may be provided. For example, ICCM 220 may provide the instruction set to memory controller 205 based on receiving the access command.

At block 355, the additional memory command may be executed. For example, memory controller 205, DCCM 225, and/or memory array 305 may be used to execute the received additional memory command in accordance with the retrieved instruction set. In some examples, memory controller 205, DCCM 225, and/or memory array 305 may wait until the execution of the previous command sequence has completed before executing the additional command sequence. In other examples, memory controller 205, DCCM 225, and/or memory array 305 may begin executing the additional command sequence while the previous command sequence is ongoing—e.g., if the previous command sequence is being used to access non-volatile memory and the additional command sequence is used to access volatile memory that uses a different bus than the non-volatile memory.

In some examples, the additional command sequence is used to execute a cmd8 command. When a register storing device-specific information is stored in volatile memory and a previous command is currently being executed to access information in non-volatile memory, memory controller 205 may issue the commands of the additional command sequence and the volatile memory may output the contents of the register while the previous command is being executed. Similarly, if the additional command sequence is used to execute a cmd6 command, memory controller 205 may update the contents of the register stored in volatile memory while the previous command is being executed.

Figure 4:
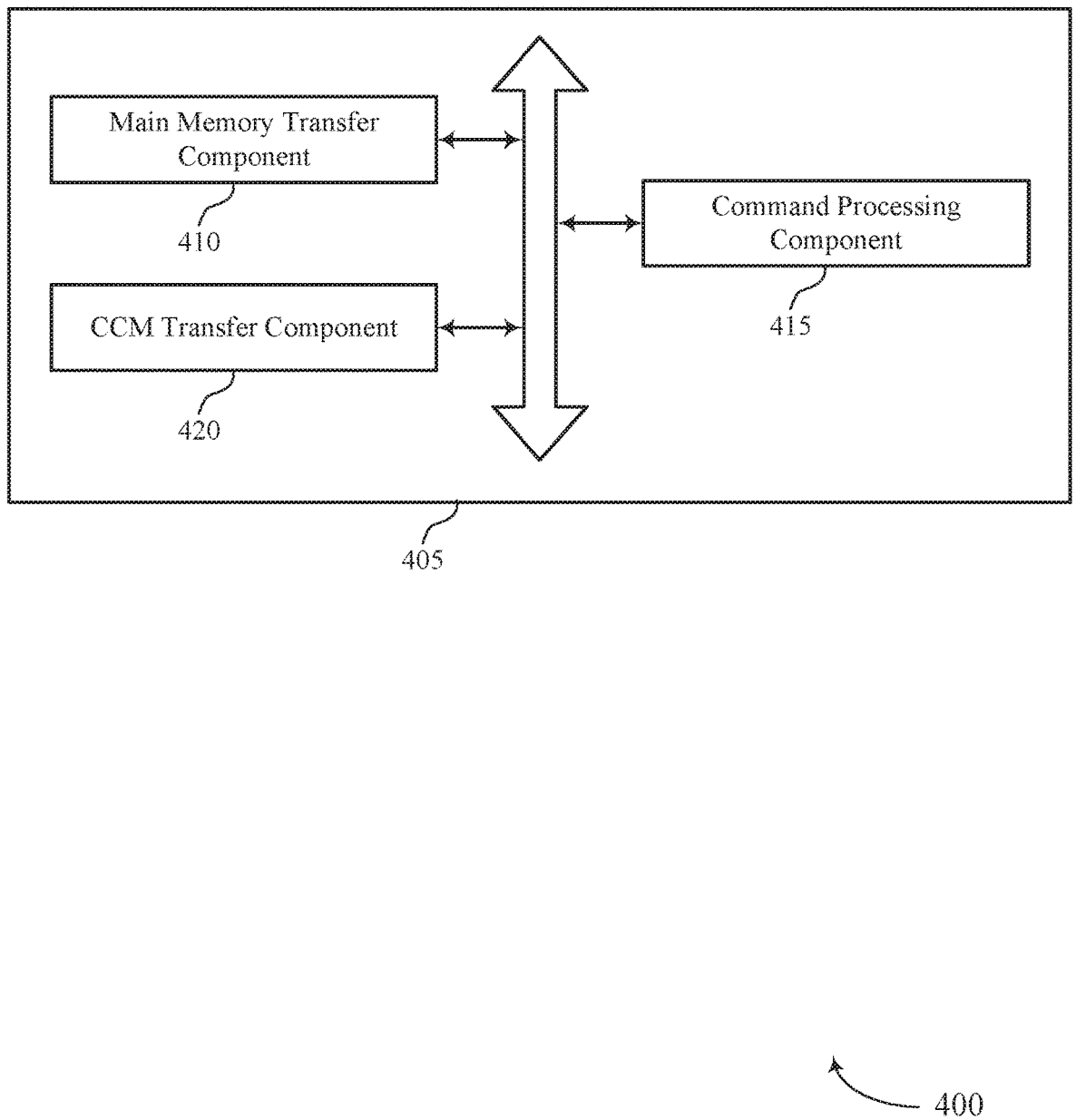
FIG. 4 shows a block diagram of a memory controller that supports an enhanced instruction caching scheme in accordance with examples as disclosed herein.

FIG. 4 shows a block diagram 400 of a memory controller 405 that supports an enhanced instruction caching scheme in accordance with examples as disclosed herein. The memory controller 405 may be an example of aspects of a memory controller as described with reference to FIGS. 1-3. The memory controller 405 may include a main memory transfer component 410, a command processing component 415, and a CCM transfer component 420. Each of these modules may communicate, directly or indirectly, with one another (e.g., via one or more buses).

The main memory transfer component 410 may transfer a first set of instruction sets from a memory array to a first memory component associated with storing data for use by a memory controller. In some cases, the first memory component is further associated with storing second control information. In some cases, the first set of instruction sets are transferred to the first memory component as part of a startup procedure based on a likelihood of each of the first set of instruction sets to be used satisfying a first threshold.

In some examples, the main memory transfer component 410 may transfer, from the memory array, a second set of instruction sets to the second memory component as part of the startup procedure, where the likelihood of each of the second set of instruction sets to be used satisfies a second threshold that is greater than the first threshold. In some cases, the first set of instruction sets are transferred into banked locations of the first memory component and the second set of instruction sets are transferred to banked locations of the first memory component. In some cases, the first set of instruction sets include a first instruction set associated with executing a CMD6 command and a second instruction set associated with executing a CMD8 command.

The main memory transfer component 410 may transfer first instruction sets stored in a memory array to a first memory component associated with storing data for use by a memory controller. In some examples, the main memory transfer component 410 may transfer second instruction sets stored in the memory array to the second memory component at a startup time.

The command processing component 415 may receive a command associated with the memory controller based on transferring the first set of instruction sets. In some examples, the command processing component 415 may retrieve the instruction set from the second memory component based on transferring the instruction set from the first memory component to the second memory component. In some examples, the command processing component 415 may perform an operation in accordance with the command sequence based on retrieving the instruction set from the second memory component.

In some examples, the command processing component 415 may receive a second command associated with the memory controller, where the second command is further associated with accessing the memory array. In some examples, the command processing component 415 may determine that a second instruction set is present in the second memory component, the second instruction set including a second command sequence for executing the second command. In some examples, the command processing component 415 may retrieve the second instruction set from the second memory component based on the determining.

In some examples, the command processing component 415 may perform, with the memory array, an operation associated with accessing the memory array in accordance with the second command sequence, the operation being associated with a duration, where the instruction set associated with the command is transferred from the first memory component to the second memory component during the duration based on the command being received during the duration.

The CCM transfer component 420 may transfer an instruction set of the first set of instruction sets stored in the first memory component to a second memory component associated with storing control information for use by the memory controller based on receiving the command. In some cases, the instruction set may include a command sequence for executing the command. In some examples, the CCM transfer component 420 may determine that the instruction set is absent from the second memory component and present in the first memory component, where the instruction set is transferred from the first memory component to the second memory component based on the determining. In some examples, the CCM transfer component 420 may transfer a subset of the first set of instruction sets to the second memory component from the first memory component as part of the startup procedure, where the likelihood of each of the subset of the first set of instruction sets to be used satisfies a second threshold that is greater than the first threshold.

In some examples, the CCM transfer component 420 may transfer the instruction set to the second memory component by accessing a set of data stored in a location of the first memory component that includes the instruction set and writing the set of data that is accessed to a second location of the second memory component.

The command processing component 415 may receive a command associated with the memory controller based on transferring the first instruction sets. In some examples, the command processing component 415 may execute the command sequence based on the instruction set obtained from the second memory component.

In some examples, the command processing component 415 may retrieve the instruction set from the second memory component based on transferring the instruction set to the second memory component. In some cases, the instruction set is obtained from the first memory component via the second memory component based on transferring the instruction set from the first memory component to the second memory component and accessing a location of the second memory component including the instruction set.

In some examples, the command processing component 415 may receive a second command associated with the memory controller, where the second command is further associated with accessing the memory array. In some examples, the command processing component 415 may determine that a second instruction set is present in the second memory component, the second instruction set including a second command sequence for executing the second command. In some examples, the command processing component 415 may retrieve the second instruction set from the second memory component based on the determining. In some examples, the command processing component 415 may access the memory array in accordance with the second command sequence.

The CCM transfer component 420 may obtain an instruction set of the first instruction sets stored in the first memory component via a second memory component associated with storing control information for use by the memory controller, the instruction set including a command sequence for executing the command. In some examples, the CCM transfer component 420 may transfer the instruction set from the first memory component to the second memory component based on receiving the command. In some examples, the CCM transfer component 420 may determine that the instruction set is absent from the second memory component and present in the first memory component and transfer the instruction set from the first memory component to the second memory component based on the determining.

Figure 5:
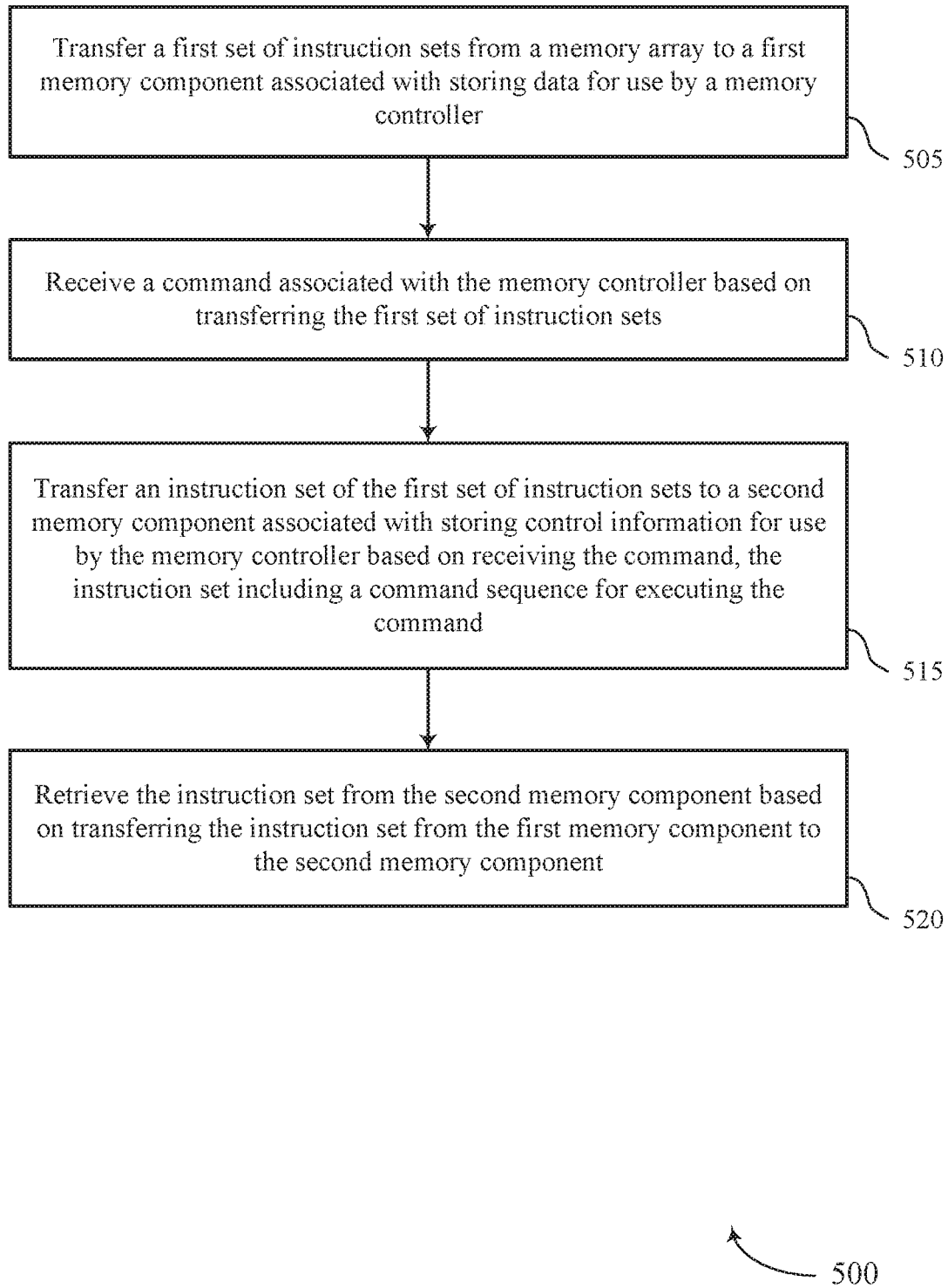

FIG. 5 shows a flowchart illustrating a method or methods 500 that supports an enhanced instruction caching scheme in accordance with examples as disclosed herein. The operations of method 500 may be implemented by a memory controller or its components as described herein. For example, the operations of method 500 may be performed by a memory controller as described with reference to FIG. 4. In some examples, a memory controller may execute a set of instructions to control the functional elements of the memory controller to perform the described functions. Additionally, or alternatively, a memory controller may perform aspects of the described functions using special-purpose hardware.

At 505, the memory controller may transfer a first set of instruction sets from a memory array to a first memory component associated with storing data for use by a memory controller. The operations of 505 may be performed according to the methods described herein. In some examples, aspects of the operations of 505 may be performed by a main memory transfer component as described with reference to FIG. 4.

At 510, the memory controller may receive a command associated with the memory controller based on transferring the first set of instruction sets. The operations of 510 may be performed according to the methods described herein. In some examples, aspects of the operations of 510 may be performed by a command processing component as described with reference to FIG. 4.

At 515, the memory controller may transfer an instruction set of the first set of instruction sets to a second memory component associated with storing control information for use by the memory controller based on receiving the command, the instruction set including a command sequence for executing the command. The operations of 515 may be performed according to the methods described herein. In some examples, aspects of the operations of 515 may be performed by a CCM transfer component as described with reference to FIG. 4.

At 520, the memory controller may retrieve the instruction set from the second memory component based on transferring the instruction set from the first memory component to the second memory component. The operations of 520 may be performed according to the methods described herein. In some examples, aspects of the operations of 520 may be performed by a command processing component as described with reference to FIG. 4.

In some examples, an apparatus as described herein may perform a method or methods, such as the method 500. The apparatus may include features, means, or instructions (e.g., a non-transitory computer-readable medium storing instructions executable by a processor) for transferring a first set of instruction sets from a memory array to a first memory component associated with storing data for use by a memory controller, receiving a command associated with the memory controller based on transferring the first set of instruction sets, transferring an instruction set of the first set of instruction sets to a second memory component associated with storing control information for use by the memory controller based on receiving the command, the instruction set including a command sequence for executing the command, and retrieving the instruction set from the second memory component based on transferring the instruction set from the first memory component to the second memory component.

Some examples of the method 500 and the apparatus described herein may further include operations, features, means, or instructions for performing an operation in accordance with the command sequence based on retrieving the instruction set from the second memory component.

Some examples of the method 500 and the apparatus described herein may further include operations, features, means, or instructions for determining that the instruction set may be absent from the second memory component and present in the first memory component, where the instruction set may be transferred from the first memory component to the second memory component based on the determining.

Some examples of the method 500 and the apparatus described herein may further include operations, features, means, or instructions for accessing a set of data stored in a location of the first memory component that includes the instruction set, and writing the set of data that may be accessed to a second location of the second memory component, where the instruction set may be transferred from the first memory component to the second memory component based on the accessing and the writing.

Some examples of the method 500 and the apparatus described herein may further include operations, features, means, or instructions for receiving a second command associated with the memory controller, where the second command may be further associated with accessing the memory array, determining that a second instruction set may be present in the second memory component, the second instruction set including a second command sequence for executing the second command, and retrieving the second instruction set from the second memory component based on the determining.

Some examples of the method 500 and the apparatus described herein may further include operations, features, means, or instructions for performing an operation associated with accessing the memory array with the memory array in accordance with the second command sequence, the operation being associated with a duration, where the instruction set associated with the command may be transferred from the first memory component to the second memory component during the duration based on the command being received during the duration.

In some examples of the method 500 and the apparatus described herein, the first memory component may be further associated with storing second control information, and where the first set of instruction sets may be transferred to the first memory component as part of a startup procedure, and where a likelihood of each of the first set of instruction sets to be used satisfies a first threshold.

In some examples of the method 500 and the apparatus described herein, the first set of instruction sets may be transferred into banked locations of the first memory component.

Some examples of the method 500 and the apparatus described herein may further include operations, features, means, or instructions for transferring a subset of the first set of instruction sets to the second memory component from the first memory component as part of the startup procedure, where the likelihood of each of the subset of the first set of instruction sets to be used satisfies a second threshold that may be greater than the first threshold.

Some examples of the method 500 and the apparatus described herein may further include operations, features, means, or instructions for transferring, from the memory array, a second set of instruction sets to the second memory component as part of the startup procedure, where the likelihood of each of the second set of instruction sets to be used satisfies a second threshold that may be greater than the first threshold.

In some examples of the method 500 and the apparatus described herein, the second set of instruction sets may be transferred to banked locations of the first memory component.

In some examples of the method 500 and the apparatus described herein, the first set of instruction sets include a first instruction set associated with executing a CMD6 command and a second instruction set associated with executing a CMD8 command.

FIG. 6 shows a flowchart illustrating a method or methods 600 that supports an enhanced instruction caching scheme in accordance with examples as disclosed herein. The operations of method 600 may be implemented by a memory controller or its components as described herein. For example, the operations of method 600 may be performed by a memory controller as described with reference to FIG. 4. In some examples, a memory controller may execute a set of instructions to control the functional elements of the memory controller to perform the described functions. Additionally, or alternatively, a memory controller may perform aspects of the described functions using special-purpose hardware.

At 605, the memory controller may transfer first instruction sets stored in a memory array to a first memory component associated with storing data for use by a memory controller. The operations of 605 may be performed according to the methods described herein. In some examples, aspects of the operations of 605 may be performed by a main memory transfer component as described with reference to FIG. 4.

At 610, the memory controller may receive a command associated with the memory controller based on transferring the first instruction sets. The operations of 610 may be performed according to the methods described herein. In some examples, aspects of the operations of 610 may be performed by a command processing component as described with reference to FIG. 4.

At 615, the memory controller may obtain an instruction set of the first instruction sets stored in the first memory component via a second memory component associated with storing control information for use by the memory controller, the instruction set including a command sequence for executing the command. The operations of 615 may be performed according to the methods described herein. In some examples, aspects of the operations of 615 may be performed by a CCM transfer component as described with reference to FIG. 4.

At 620, the memory controller may execute the command sequence based on the instruction set obtained from the second memory component. The operations of 620 may be performed according to the methods described herein. In some examples, aspects of the operations of 620 may be performed by a command processing component as described with reference to FIG. 4.

In some examples, an apparatus as described herein may perform a method or methods, such as the method 600. The apparatus may include features, means, or instructions (e.g., a non-transitory computer-readable medium storing instructions executable by a processor) for transferring first instruction sets stored in a memory array to a first memory component associated with storing data for use by a memory controller, receiving a command associated with the memory controller based on transferring the first instruction sets, obtaining an instruction set of the first instruction sets stored in the first memory component via a second memory component associated with storing control information for use by the memory controller, the instruction set including a command sequence for executing the command, and executing the command sequence based on the instruction set obtained from the second memory component.

Some examples of the method 600 and the apparatus described herein may further include operations, features, means, or instructions for transferring the instruction set from the first memory component to the second memory component based on receiving the command, and retrieving the instruction set from the second memory component based on transferring the instruction set to the second memory component, where the instruction set may be obtained from the first memory component via the second memory component based on transferring the instruction set from the first memory component to the second memory component and accessing a location of the second memory component including the instruction set.

Some examples of the method 600 and the apparatus described herein may further include operations, features, means, or instructions for determining that the instruction set may be absent from the second memory component and present in the first memory component, where the instruction set may be transferred from the first memory component to the second memory component based on the determining.

Some examples of the method 600 and the apparatus described herein may further include operations, features, means, or instructions for receiving a second command associated with the memory controller, where the second command may be further associated with accessing the memory array, determining that a second instruction set may be present in the second memory component, the second instruction set including a second command sequence for executing the second command, retrieving the second instruction set from the second memory component based on the determining, and accessing the memory array in accordance with the second command sequence.

Some examples of the method 600 and the apparatus described herein may further include operations, features, means, or instructions for transferring second instruction sets stored in the memory array to the second memory component at a startup time.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory array, a memory controller coupled with the memory array, a first memory component associated with storing data for use by the memory controller, a second memory component associated with storing control information for use by the memory controller, where the memory controller is configured to, retrieve control information from the second memory component, obtain an instruction set stored in the first memory component by transferring the instruction set from the first memory component to the second memory component, and execute a command sequence based on the instruction set obtained from the second memory component.

In some examples, the memory controller may be closely-coupled with the first memory component and the second memory component.

In some examples, the first memory component may be further associated with storing second control information for use by the memory controller and includes first banked locations for storing a first set of instruction sets, and the second memory component includes second banked locations for storing a second set of instruction sets.

In some examples, the first memory component includes first unbanked locations for storing the data, and the second memory component includes second unbanked locations for storing a second portion of the control information.

In some examples, a first quantity of the first banked locations may be greater than a second quantity of the second banked locations.

Some examples of the apparatus may include a first bus coupled with the memory array and the memory controller, and a second bus coupled with the memory array, the first memory component, and the second memory component.

Some examples of the apparatus may include a second memory array configured to store device-specific information, where the memory array includes non-volatile memory cells, and where the first memory component, the second memory component, and the second memory array include volatile memory cells.

Some examples of the apparatus may include a first bus coupled with the memory array and the memory controller, a second bus coupled with the memory array, the first memory component, and the second memory component, and a third bus coupled with the memory controller and the second memory array.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory array;
a memory controller coupled with the memory array;
a first memory component associated with storing data for use by the memory controller, the first memory component different from the memory array;
a second memory component associated with storing control information for use by the memory controller, the second memory component different from the memory;
a first bus coupled with the memory array and the memory controller; and
a second bus coupled with the memory controller, the first memory component, and the second memory component, wherein the first memory component and the second memory component are each directly accessible by the memory controller, and wherein the memory controller is configured to:
retrieve the data from the first memory component;
retrieve the control information from the second memory component;
obtain an instruction set stored in the first memory component by transferring the instruction set from the first memory component to the second memory component; and
execute a command sequence based at least in part on the instruction set obtained from the second memory component.

2. The apparatus of claim 1, wherein the memory controller is closely-coupled with the first memory component and the second memory component.

3. The apparatus of claim 1, wherein:
the first memory component is further associated with storing second control information for use by the memory controller and comprises first banked locations for storing a first plurality of instruction sets; and
the second memory component comprises second banked locations for storing a second plurality of instruction sets.

4. The apparatus of claim 3, wherein:
the first memory component comprises first unbanked locations for storing the data; and
the second memory component comprises second unbanked locations for storing a second portion of the control information.

5. The apparatus of claim 3, wherein a first quantity of the first banked locations is greater than a second quantity of the second banked locations.

6. The apparatus of claim 1, further comprising:
a second memory array configured to store device-specific information, wherein the memory array comprises non-volatile memory cells, and wherein the first memory component, the second memory component, and the second memory array comprise volatile memory cells.

7. The apparatus of claim 6, further comprising:
a third bus coupled with the memory controller and the second memory array.

8. An apparatus comprising:
a memory array;
a first memory component coupled with the memory array and associated with storing data;
a second memory component coupled with the first memory component and associated with storing control information; and
a memory controller coupled with the memory array, the first memory component, and the second memory component, wherein the first memory component and the second memory component are each directly accessible by the memory controller, and wherein the memory controller is configured to access the data from the first memory component and the control information from the second memory component and is configured to:
transfer a plurality of instruction sets from the memory array to the first memory component;
receive a command associated with the memory controller based at least in part on transferring the plurality of instruction sets;
transfer, from the first memory component, an instruction set of the plurality of instruction sets to the second memory component based at least in part on receiving the command, the instruction set comprising a command sequence for executing the command; and
retrieve, by the memory controller, the instruction set from the second memory component based at least in part on transferring the instruction set from the first memory component to the second memory component.

9. The apparatus of claim 8, wherein the memory controller is further operable to:
perform an operation in accordance with the command sequence based at least in part on retrieving the instruction set from the second memory component.

10. The apparatus of claim 8, wherein the memory controller is further operable to:
determine that the instruction set is absent from the second memory component and present in the first memory component, wherein the instruction set is transferred from the first memory component to the second memory component based at least in part on the determining.

11. The apparatus of claim 8, wherein the memory controller is further operable to:
access a set of data stored in a location of the first memory component that comprises the instruction set; and
write the set of data that is accessed to a second location of the second memory component, wherein the instruction set is transferred from the first memory component to the second memory component based at least in part on the accessing and the writing.

12. The apparatus of claim 8, wherein the memory controller is further operable to:
receive a second command associated with the memory controller, wherein the second command is further associated with accessing the memory array;
determine that a second instruction set is present in the second memory component, the second instruction set comprising a second command sequence for executing the second command; and retrieve the second instruction set from the second memory component based at least in part on the determining.

13. The apparatus of claim 8, wherein, to directly access the first memory component and the second memory component, the memory controller may be further configured to:
access control information stored at first unbanked locations of the first memory component that are directly addressable by the memory controller; and
access data stored at second unbanked locations of the second memory component that are directly addressable by the memory controller.

14. The apparatus of claim 8, wherein:
to transfer the instruction set from the first memory component to the second memory component, the memory controller may be further configured to release the instruction set stored at a location of the first memory component onto a bus and to cause the second memory component to load the instruction set from the bus into a location of the second memory component,
the memory controller is configured to retrieve the instruction set from the second memory component via the bus, and
the memory controller is further configured to retrieve the data from the first memory component via the bus.

15. An apparatus, comprising:
a memory array;
a first memory component coupled with the memory array and associated with storing data;
a second memory component coupled with the first memory component and associated with storing control information; and
a memory controller coupled with the memory array, the first memory component, and the second memory component and configured to access the data from the first memory component and the control information from the second memory component, the memory controller configured to:
transfer a plurality of instruction sets from the memory array to the first memory component;
receive a command associated with the memory controller based at least in part on transferring the plurality of instruction sets;
transfer an instruction set of the plurality of instruction sets to the second memory component based at least in part on receiving the command, the instruction set comprising a command sequence for executing the command;
retrieve, by the memory controller, the instruction set from the second memory component based at least in part on transferring the instruction set from the first memory component to the second memory component;
receive a second command associated with the memory controller, wherein the second command is further associated with accessing the memory array;
determine that a second instruction set is present in the second memory component, the second instruction set comprising a second command sequence for executing the second command;
retrieve the second instruction set from the second memory component based at least in part on the determining; and
perform, with the memory array, an operation associated with accessing the memory array in accordance with the second command sequence, the operation being associated with a duration, wherein the instruction set associated with the command is transferred from the first memory component to the second memory component during the duration based at least in part on the command being received during the duration.

16. An apparatus, comprising:
a memory array;
a first memory component coupled with the memory array and associated with storing data;
a second memory component coupled with the first memory component and associated with storing control information; and
a memory controller coupled with the memory array, the first memory component, and the second memory component and configured to access the data from the first memory component and the control information from the second memory component, the memory controller configured to:
transfer a plurality of instruction sets from the memory array to the first memory component;
receive a command associated with the memory controller based at least in part on transferring the plurality of instruction sets;
transfer an instruction set of the plurality of instruction sets to the second memory component based at least in part on receiving the command, the instruction set comprising a command sequence for executing the command, wherein the first memory component is further associated with storing second control information, wherein the plurality of instruction sets are transferred to the first memory component as part of a startup procedure, and wherein a likelihood of each of the plurality of instruction sets to be used satisfies a first threshold; and
retrieve, by the memory controller, the instruction set from the second memory component based at least in part on transferring the instruction set from the first memory component to the second memory component.

17. The apparatus of claim 16, wherein the plurality of instruction sets are transferred into banked locations of the first memory component.

18. The apparatus of claim 16, wherein the memory controller is further operable to:
transfer a subset of the plurality of instruction sets to the second memory component from the first memory component as part of the startup procedure, wherein the likelihood of each of the subset of the plurality of instruction sets to be used satisfies a second threshold that is greater than the first threshold.

19. The apparatus of claim 16, wherein the memory controller is further operable to:
transfer, from the memory array, a second plurality of instruction sets to the second memory component as part of the startup procedure, wherein the likelihood of each of the second plurality of instruction sets to be used satisfies a second threshold that is greater than the first threshold.

20. The apparatus of claim 19, wherein the second plurality of instruction sets are transferred to banked locations of the first memory component.

21. An apparatus, comprising:
a memory array;
a first memory component coupled with the memory array and associated with storing data;

a second memory component coupled with the first memory component and associated with storing control information; and a memory controller coupled with the memory array, the first memory component, and the second memory component and configured to access the data from the first memory component and the control information from the second memory component, the memory controller configured to:

transfer a plurality of instruction sets from the memory array to the first memory component, wherein the plurality of instruction sets comprise a first instruction set associated with executing a CMD6 command and a second instruction set associated with executing a CMD8 command;

receive a command associated with the memory controller based at least in part on transferring the plurality of instruction sets; and transfer an instruction set of the plurality of instruction sets to the second memory component based at least in part on receiving the command, the instruction set comprising a command sequence for executing the command.

22. A method, performed by a memory device, comprising:

transferring instruction sets stored in a memory array to a first memory component associated with storing data for use by a memory controller;

receiving a command associated with the memory controller based at least in part on transferring the instruction sets;

obtaining an instruction set of the instruction sets stored in the first memory component via a second memory component associated with storing control information for use by the memory controller, wherein the instruction set comprises a command sequence for executing the command, and wherein the first memory component and the second memory component are each directly accessible by the memory controller; and executing the command sequence based at least in part on the instruction set obtained from the second memory component.

23. The method of claim 22, further comprising:

transferring the instruction set from the first memory component to the second memory component based at least in part on receiving the command; and retrieving the instruction set from the second memory component based at least in part on transferring the instruction set to the second memory component, wherein the instruction set is obtained from the first memory component via the second memory component based at least in part on transferring the instruction set from the first memory component to the second memory component and accessing a location of the second memory component comprising the instruction set.

24. The method of claim 22, further comprising:

determining that the instruction set is absent from the second memory component and present in the first memory component, wherein the instruction set is transferred from the first memory component to the second memory component based at least in part on the determining.

25. The method of claim 22, further comprising:

receiving a second command associated with the memory controller, wherein the second command is further associated with accessing the memory array;

determining that a second instruction set is present in the second memory component, the second instruction set comprising a second command sequence for executing the second command;

retrieving the second instruction set from the second memory component based at least in part on the determining; and accessing the memory array in accordance with the second command sequence.

26. The method of claim 22, further comprising:

transferring second instruction sets stored in the memory array to the second memory component at a startup time.

27. The method of claim 22, wherein transferring the instruction set from the first memory component to the second memory component comprises:

releasing the instruction set stored at a location of the first memory component onto a bus; and causing the second memory component to load the instruction set from the bus into a location of the second memory component, the method further comprising:

retrieving, at the memory controller, the instruction set from the second memory component via the bus; and retrieving, at the memory controller, the data from the first memory component via the bus.

* * * * *